United States Patent [19]

Vanderheiden et al.

[11] 3,854,131

[45] Dec. 10, 1974

[54] AUTO-MONITORING COMMUNICATION DEVICES FOR HANDICAPPED PERSONS

[76] Inventors: Greg C. Vanderheiden, 1323 Randall Ct., Madison, Wis. 53715; David F. Lamers, 8943 Robin Dr., Des Plains, Ill. 60016; Chris Daniel Geisler, 138 Lothrop St.; Andrew M. Volk, 1240 Sweetbriar Rd., both of Madison, Wis. 53705

[22] Filed: Apr. 23, 1973

[21] Appl. No.: 353,462

[52] U.S. Cl. .......... 340/365 L, 178/17 C, 335/206, 200/513

[51] Int. Cl. .......... G08c 1/00

[58] Field of Search ..... 340/365 R, 365 L, 173 PM, 340/365 E; 178/17 R, 17 C, 18, 101; 335/206; 197/98; 200/5 R

[56] References Cited

UNITED STATES PATENTS

| | | | |
|---|---|---|---|
| 3,413,610 | 11/1968 | Botjer | 340/172.5 |
| 3,466,647 | 9/1969 | Guzak | 340/365 E |
| 3,469,242 | 9/1969 | Eachus et al. | 340/174 PM |
| 3,559,205 | 1/1971 | Colby | 335/206 |
| 3,713,056 | 1/1973 | Hosokawa | 335/206 |
| 3,735,298 | 5/1973 | Colby | 335/206 |
| 3,750,062 | 7/1973 | Goto | 340/365 L |

*Primary Examiner*—John W. Caldwell
*Assistant Examiner*—Richard P. Lange
*Attorney, Agent, or Firm*—Burmeister, Palmatier & Hamby

[57] ABSTRACT

A communication device is provided for handicapped persons, such as persons suffering from cerebral palsy who are unable to speak, write, or operate a typewriter. The device comprises a board or panel having a matrix of communication elements thereon, such as letters, numerals, symbols, words and the like. A corresponding matrix of sensors is mounted under the board. The handicapped person operates a slider or cursor which is movable on the surface of the panel. Each sensor is sensitive to the proximity of the cursor and is operable by an element of the cursor when such element is moved opposite the communication element which corresponds to the sensor. For example, the cursor may carry a permanent magnet for operating the sensors, which may be in the form of reed switches. Many other types of sensors and cursors may be employed. When the magnet or other operating element of the cursor is moved over a particular communication element, the corresponding sensor is operated. The sensors are connected to control circuits which preferably operate a red light or other signal to show that one of the sensors has been operated. After the sensor remains operated for a predetermined interval, the control circuits generate a print command signal which causes a character to be printed, corresponding to the communication element which is associated with the sensor. The character may be printed by either a hard copy printer or a video display, or both. The control circuits preferably actuate a green light or some other print signal which indicates that the communication element has been printed. The delay in the printing of the communication element makes it possible for the handicapped person to move the cursor over the surface of the panel without causing any character to be printed until the cursor is brought to rest or caused to hover in proximity to one of the communication elements for a predetermined time interval. Thus, the device prints the communication element in response to cessation of movement of the cursor rather than movement thereof.

11 Claims, 8 Drawing Figures

AUTO-MONITORING COMMUNICATION DEVICES FOR HANDICAPPED PERSONS

This invention relates to communication devices for many applications, particularly for use by severely handicapped persons, such as those suffering from cerebral palsy or strokes. Many of these handicapped persons are unable to speak and are also incapable of writing or operating a typewriter.

One object of the present invention is to provide a new and improved communication device which can be used by a handicapped person who has some degree of motor control, but not a sufficient degree to enable the person to operate a typewriter or the like.

A further object is to provide a new and improved communication device which includes an automatic monitor or readout so that the device can be operated solely by the handicapped person without any monitoring or assistance from anyone else.

Thus, the present invention may comprise a panel or board having a matrix of communication elements thereon, such as letters, numerals, symbols, words or the like. The matrix may comprise columns and rows of such communication elements, each of which may be printed or written on an individual square or other area on the board. The handicapped person is provided with a cursor or slider which is movable over the matrix on the surface of the board.

The handicapped person uses the communication device by moving the cursor until the entire cursor or some part thereof is in proximity to the particular communication element which is desired. The handicapped person then stops the cursor or at least causes it to hover in proximity to the communication element. When this is done for a predetermined time interval, the communication device prints the communication element, or produces some other readout, such as a video display or some other temporary display. The handicapped person can then go onto the next communication element.

The panel or board preferably has a matrix of sensors mounted beneath the panel and aligned with the corresponding communication elements. Each sensor is sensitive to the proximity of the cursor or some element thereon. Thus, for example, a permanent magnet may be mounted on the cursor to operate the sensors. Each sensor may include a reed switch or some other device adapted to be operated by the proximity of the permanent magnet. Many other types of cursors and sensors may be employed.

When one of the sensors is operated, a timing device preferably delays the printing of the corresponding communication element so that the device will respond to absence of movement of the cursor rather than movement thereof. If the cursor remains over the communication element for the necessary time interval, the timing device produces a print command signal which causes the printing of the information element.

The device also preferably includes feedback signals so that the handicapped person will be kept informed as to the operation of the device. A first feedback signal, such as a red light, may be operated when the cursor operates one of the sensors. When the print command signal is generated, a second feedback signal may be actuated. Such signal may be in the form of a green light, for example. The feedback signals may also include devices for producing audible clicks or other sounds in addition to the visual signals.

Further objects, advantages and features of the present invention will appear from the following description, taken with the accompanying drawings, in which.

Figures 1, 2:
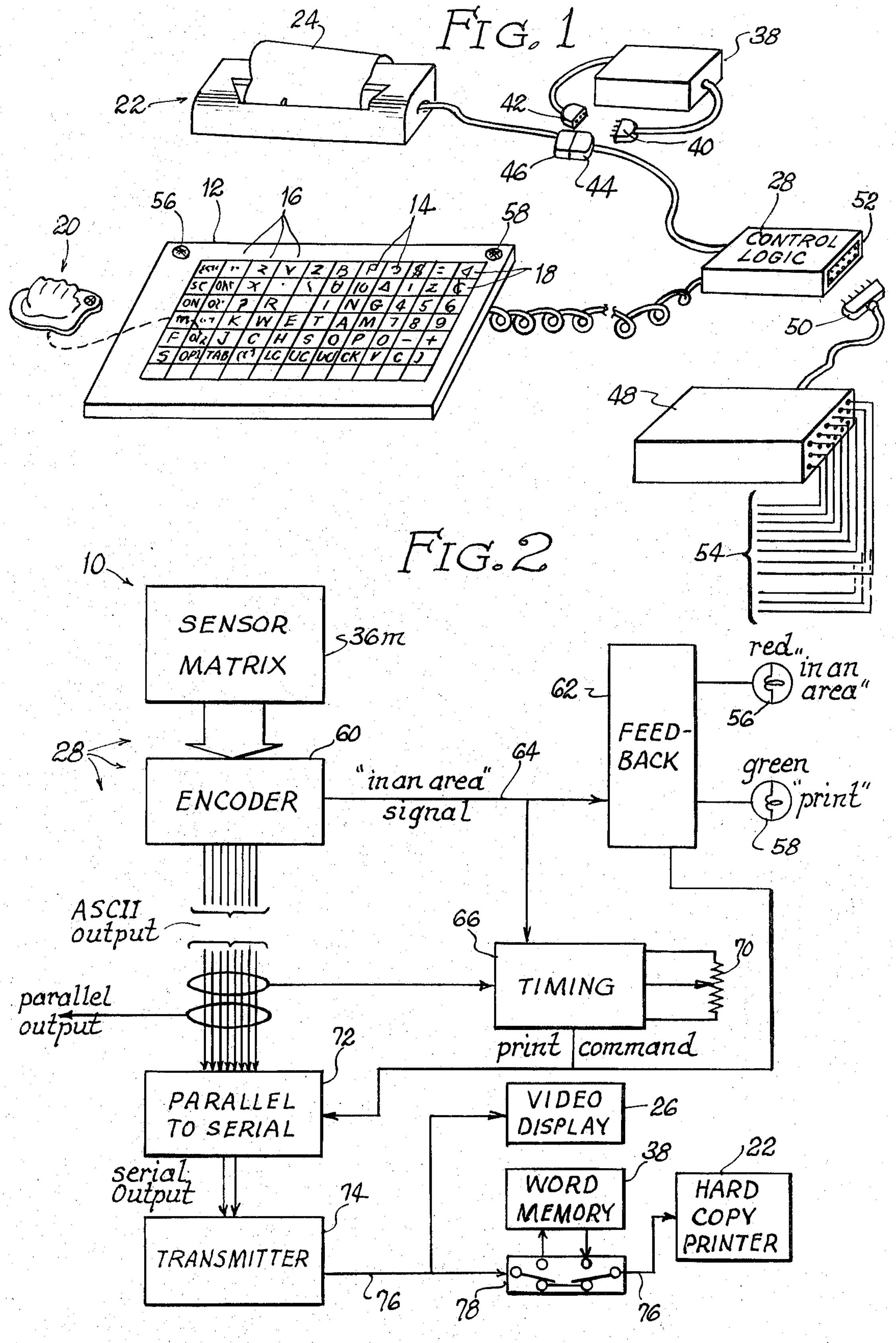
FIG. 1 is a diagrammatic perspective view showing an auto-monitoring communication device to be described as an illustrative embodiment of the present invention.
FIG. 2 is a schematic block diagram of the communication device.

As just indicated, FIGS. 1 and 2 illustrate an embodiment of the invention in the form of an auto-monitoring communication device 10, comprising a communication board or panel 12 having a matrix of communication elements 14 thereon. Such elements normally include all of the letters of the alphabet, all of the numerals from 0 to 9, and any symbols which may be desired. The communication elements may also include words and various operational comments or the like.

As shown, the communication elements 14 are arranged in a rectangular matrix comprising a plurality of columns 16 and rows 18. Each element 14 may include a square or other area on the board 12. The particular communication element may be printed or written within the square. The matrix of communication elements 14 should be of such a size that all of the elements can easily be reached by a handicapped person.

For the use of the handicapped person, a cursor or slider 20 is provided and is adapted to be moved anywhere on the surface of the board 12. The handicapped person attempts to align the cursor 20, or some part thereof, with the desired communication element 14 on the board 12. When the desired communication element has thus been selected, it is printed or otherwise monitored by a printing device 22, which is shown as a hard copy printer, adapted to type or otherwise print the selected communication element on a sheet of paper 24.

As indicated in FIG. 2, the communication device 10 may also include a video display 26, or some other form of temporary display. In some cases, only the temporary display is employed. The operation of the printing device 22 and the video display 26 is brought about by a control system 28.

Figure 4:
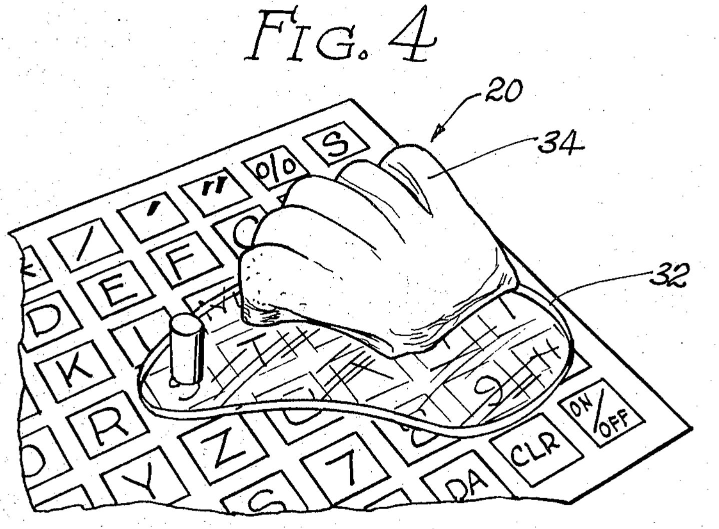
FIG. 4 is a perspective view showing the cursor and the communication panel.

As illustrated in FIGS. 1 and 4, the cursor 20 may comprise an operating element 30, which preferably takes the form of a permanent magnet. However, many other operating elements may be employed. The handicapped person operates the cursor 20 so as to bring the operating element 30 over the desired communication element 14. Thus, the operating element 30 also acts as a pointer.

In the illustrated construction, the magnet 30 is securely mounted on a slidable plate or body 32 movable along the surface of the board 12. The body 32 is preferably made of transparent material so that the communication elements can be seen through the body 32. The illustrated cursor 20 has a handrest or grip 34 mounted on the plate or body 32. Such handrest 34 makes it easier for the handicapped person to keep his hand on the cursor 20 so that he can concentrate on sliding the body 32 along the surface of the board 12.

Figure 3:
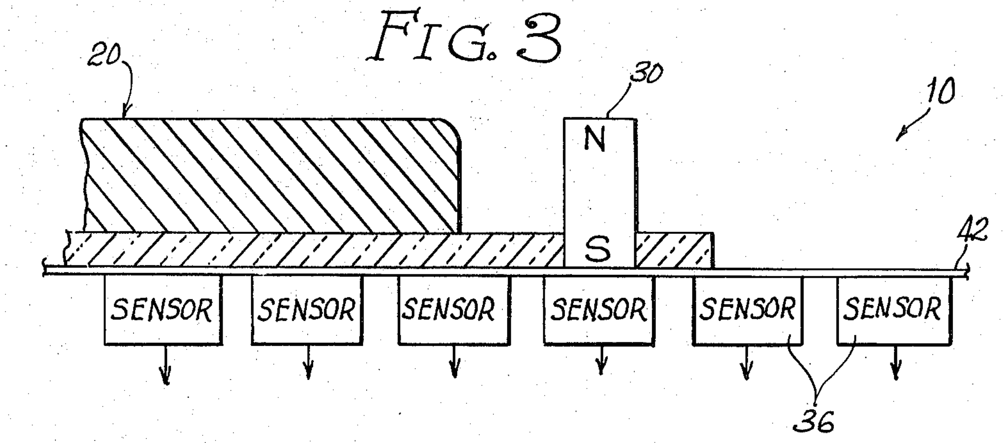
FIG. 3 is a sectional view taken through the communication panel or board.

As illustrated to best advantage in FIG. 3, the communication device 10 preferably comprises a matrix of sensors 36 mounted on the board or panel 12 and corresponding to the matrix of communication elements 14. Preferably, one sensor 36 is mounted in alignment with each communication element 14. The illustrated sensors are mounted beneath the communication board 12.

Each sensor 36 is sensitive to the proximity of the cursor 20, or some part thereof. In this case, each sensor 36 is adapted to be operated by the operating element 30 on the cursor 20. Many types of operating elements and sensors may be employed. Thus, for example, each sensor 36 may comprise a reed switch adapted to be operated by the magnet 30 when the magnet is brought into proximity with the sensor. The reed switch is operated by the magnetic attraction of the magnet 30, when the magnet is moved into alignment with the communication element which corresponds to the particular switch.

When any particular sensor 36 has been operated for a predetermined time interval by the magnet 30, the corresponding communication element is printed by the printer 22 or displayed by the video display 26. The time delay in the printing of the communication element makes it possible for the handicapped person to move the cursor 20 along the surface of the board 12 and over the matrix of communication elements 14 without printing any of the elements.

When the handicapped person stops the cursor 20 with the magnet 30 over the desired communication element, or when he causes the magnet to hover in proximity to the communication element for a predetermined time interval, the communication element will be printed. Thus, the communication device prints the desired communication element in response to cessation of movement of the cursor or localization of the movement thereof rather than in response to movement of the cursor.

If desired, a word memory unit 38 may be connected into the circuit between the control unit 28 and the printer 22. The word memory unit 38 causes the printer 22 to print a complete word or group of words in response to each communication element selected by the handicapped person. The word memory unit 38 is preferably programmed to store a different word corresponding to each of the communication elements 14.

When the handicapped person selects any particular communication element, a corresponding print command is produced by the control circuit 28. This print command causes the word memory unit 38 to retrieve the corresponding word from its memory. Signals corresponding to this word are transmitted to the printer 22 so that it prints the word.

The word memory unit 38 may be provided with connectors 40 and 42 for use in connecting the word memory unit 38 between the control circuit 28 and the printer 22. As shown, the connectors 40 and 42 are adapted to mate with connectors 44 and 46 connected to the control circuit 28 and the printer 22.

In some cases, it is also desirable to connect a function command unit 48 to the control circuit 28. As shown, the function command unit has a connector 50 adapted to mate with a connector 52 on the control circuit 28. The function command unit 48 is adapted to operate a wide variety of accessory devices in response to the selection of various communication elements 14 by the handicapped person. For this purpose, the function command unit 48 has a multiplicity of output circuits 54 which may be connected to such accessory devices as lamps or lighting circuits, heating elements or control devices, a radio, a phonograph, a call signal, an alarm signal, one or more bed motor operators and a TV set. Thus, the function command unit 48 makes it possible for the handicapped person to make various changes in his environment without any assistance from another person.

The communication device 10 preferably includes one or more feedback signals in addition to the printer 22 and the video display 26. As shown, the device 10 includes two additional feedback signals 56 and 58 which may conveniently take the form of red and green lights. However, any other desired signals may be employed. In addition to visual signals, it is often desirable to employ audio signalling devices for producing audible clicks, tones or the like.

In this case, the first signal or red light 56 is operated when the handicapped person moves the cursor 20 so as to bring the magnet 30 over any of the communication elements 14 so as to operate one of the sensors 36. The red light notifies the handicapped person that the communication element will be printed if the cursor is maintained in that area. The handicapped person then tries to keep the cursor in the desired area long enough to cause the printing of the communication element. When such printing occurs, the second signal or green light 58 is operated. This signal shows that the communication element has been printed. Preferably, this signal continues to be operated until the handicapped person moves the cursor out of the area occupied by that particular communication element.

FIG. 2 is a block diagram representing the arrangement of the control system 28 and the components associated therewith. As previously indicated, the sensors 36 are arranged in a matrix which is designated **36*m* in FIG. 2**. This matrix may include a large number of sensors, such as 84 sensors for a matrix containing 12 columns and 7 rows, for example.

For convenience in processing and handling the signals from the sensor matrix **36*m*, the control unit 28 preferably comprises an encoder, which is operative to convert the output from the matrix 36*m* into a digital code so that the output from each sensor will be represented by a particular digital number. The encoder 60 may convert the output of the sensor matrix 36*m*** into any known or suitable digital code such as the ASCII code, for example, which is a well known 8-bit digital code. If any particular sensor is operated, the encoder 60 produces a digital output corresponding to such sensor.

As previously indicated, the control unit 28 also preferably comprises a feedback circuit 62. Whenever a digital output is produced by the encoder 60, a signal is transmitted from the encoder 60 to the feedback circuit 62 by way of a channel 64. The feedback circuit 62 then energizes the signal 56, which may take the form of a red light, as previously indicated. The transmission of a signal along the channel 64 indicates that the operating element 30 on the cursor 20 is in an area on the board 12 corresponding to one of the communication elements 14.

As a step toward producing a printer or displayed output, this preliminary "in-an-area" signal is also transmitted to a timing circuit 66. If the area signal is maintained for a predetermined time interval, the timing circuit develops a print command signal which is transmitted to the feedback circuit 62 along a channel 68.

The timing circuit 66 preferably comprises an adjustable control 70 for adjusting the time interval. Upon receipt of the print command signal, the feedback circuit 62 operates the second feedback signal 58, which may take the form of a green light, as previously indicated.

The print command signal is also employed to activate the printer 22 and the video display 26. In this case, the print command signal is supplied to a parallel-to-serial converter 72, which converts the multiple bit output of the encoder 60 into a serial output adapted to be transmitted over a single transmission line, a radio channel or the like. Such converters are well known and it will be understood that any known or suitable converter may be employed.

The output of the converter 72 may be in a standard serial teletype format, for example. This serial output may be supplied to a transmitter 74, which may simply drive a transmission line 76 extending to the printer 22 and the video display 26. Some other type of communications link may be employed if desired, such as a radio link in which case the transmitter 74 would comprise a radio transmitter.

As previously indicated, the word memory unit 38 may be connected to the transmission line 76 between the transmitter 74 and the hard copy printer 22. The arrangement of FIG. 2 includes a switching circuit 78 for switching the word memory unit 38 into and out of the transmission line 76. The switching unit 78 may be operated electronically by a particular output signal from the converter 72 and the transmitter 74. One or more particular communication elements 14 and corresponding sensors 36 may be provided on the communication board 12 to control the operation of the switching circuit 78.

Thus, the handicapped person can cause the switching unit 78 to switch the word memory unit 38 into the transmission line 76 by maneuvering the cursor 20 so as to bring the operating element or magnet 30 over the communication element 14 assigned to this function. Another communication element 14 may be assigned to the function of switching the word memory unit 38 out of the transmission line 76. If desired, the same communication element may be employed to control both switching functions.

Figure 5:
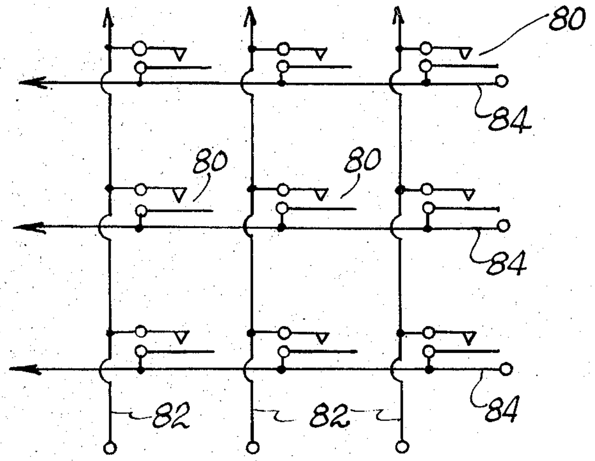
FIG. 5 is a fragmentary schematic circuit diagram showing the sensor switch matrix.

FIG. 5 illustrates the preferred arrangement of the sensors 36, which in this case comprise reed switches 80 adapted to be operated by the magnet 30. The matrix arrangement of the switches 80 will be evident from FIG. 5. The matrix employs a plurality of column bus-bars or lines 82, one for each column of the matrix, and a plurality of row bus-bars or lines 84, one for each row. Each switch 80 is connected between one of the column bus-bars and one of the two bus-bars 84. Thus, the closure of any particular switch 80 forms a connection between the corresponding column bus-bar 82 and the corresponding row bus-bar 84.

Figure 6:
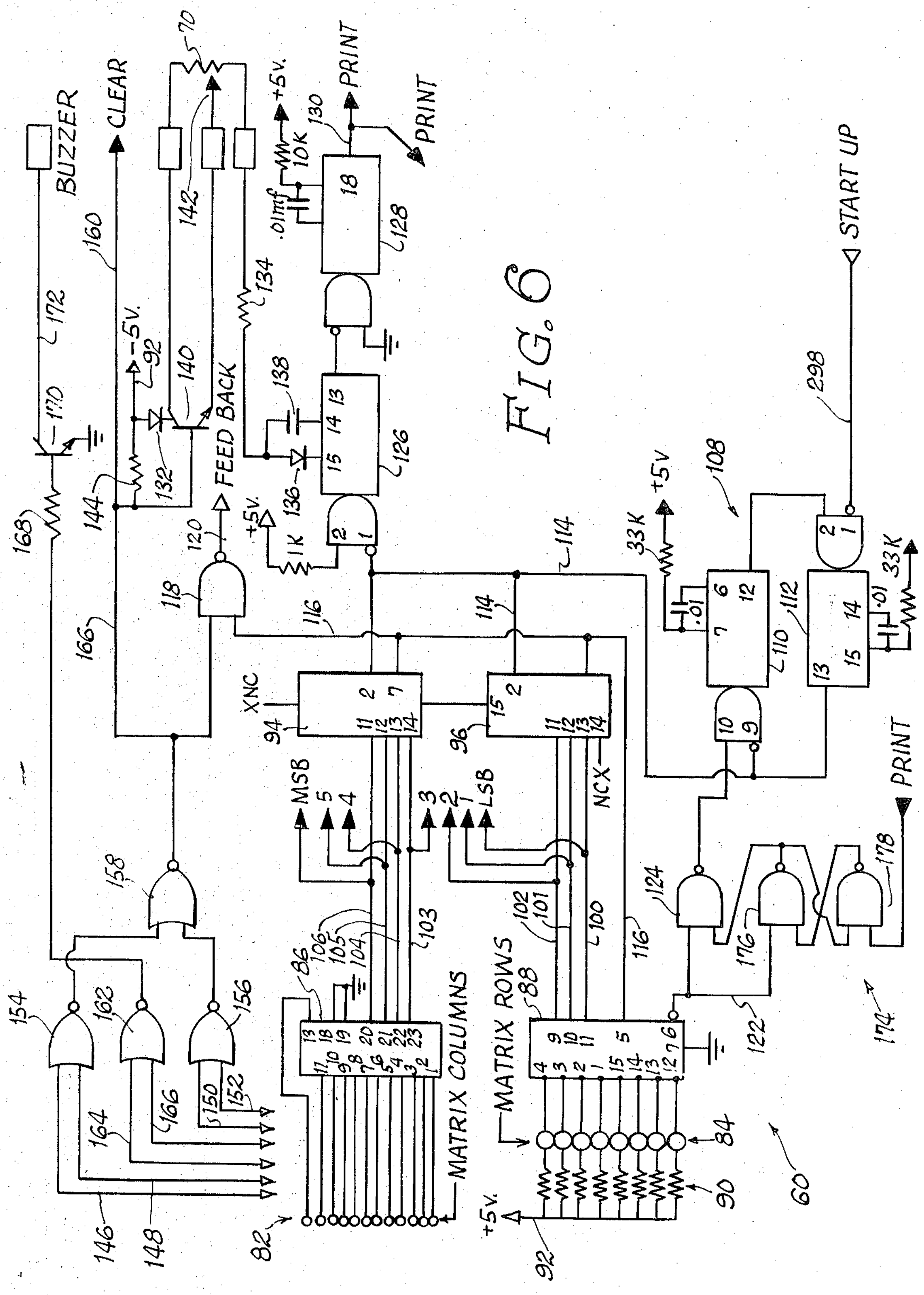
FIG. 6 is a schematic circuit diagram showing the electronic encoder circuits associated with the communication panel.

FIG. 6 illustrates details of the encoder 60 for producing electrical signals corresponding to the operation of the matrix switches 80. As shown, the column bus-bars 82 and the row bus-bars 84 are scanned by a 4-to-16 bit demultiplexer 86 and an 8-to-1 bit multiplexer 88, which may comprise commercially available integrated circuits. The column bus-bars 82 are connected to the demultiplexer 86, while the row bus-bars 84 are connected to the multiplexer 88. Individual resistors 90 may be connected between the two bus-bars 84 and a voltage source 92.

To produce scanning of the demultiplexer 86 and the multiplexer 88, synchronous binary counters 94 and 96 are connected thereto by digital lines 100, 101, 102, 103, 104, 105 and 106. The parallel digital output is obtained from such lines by means of output lines which are designated LSB (least significant bit) 1, 2, 3, 4, 5 and MSB (most significant bit).

A clock 108 is preferably provided to produce timing pulses for operating the counters 94 and 96. As shown, the clock 108 utilizes two retriggering monostables 110 and 112 connected in a ring. The monostables may take the form of commercially available integrated circuits. The clock pulses are transmitted from the clock 108 to the counters 94 and 96 by an output line 114.

The scanners 86 and 88 and the counters 94 and 96 continue to operate until one of the matrix switches 80 is closed, whereupon the multiplexer 88 develops an output signal which is transmitted to the counters over a line 116. This signal stops the counters 94 and 96 so that the scanners 86 and 88 are also stopped. The signal on the line 116 also causes operation of the first feedback signal 56, which may comprise a red light. For this purpose, the line 116 is extended to a NAND gate 118 having an output line 120 extending to the feedback circuit.

The development of an output signal by the multiplexer 88, in response to the closure of one of the matrix switches 80, also stops the clock 108. This is accomplished by connecting another output line 122 to the multiplexer 88 to derive an output signal which is supplied to a NAND gate 124. The output of the gate 124 is connected to the monostable 110 and is effective to stop the clock 108.

The development of an output signal by the multiplexer 88 also has the effect of starting the timing interval, at the end of which the print command signal is developed. As shown in FIG. 6, the print command signal is produced by another retriggering monostable 126 having its triggering input connected to the clock pulse line 114. When the clock pulses are caused to stop, the monostable 126 begins to time out. At the end of the predetermined timing interval, the monostable 126 triggers another similar monostable 128, which produces the print command signal on its output line 130, which is designated PRINT in FIG. 6.

The variable timing control 70 is connected to the monostable 126 to control the timing interval thereof. As shown, the control 70 is in the form of a potentiometer which may be connected in a series circuit between the voltage source 92 and the monostable 126. Such series circuit comprises a diode 132, the potentiometer 70, a resistor 134 and a diode 136. The potentiometer 70 and the resistor 134 are the resistance elements of an RC timing circuit which also includes a capacitor 138. In this case, a transistor 140 is shunted between the high voltage end of the potentiometer 70 and the slider 142 thereof.

The base of the transistor 140 is involved in a circuit which changes the time interval of the monostable 126 when certain of the matrix switches 80 are operated. As shown, the transistor 140 is normally conductive by virtue of a resistor 144 connected between the base and the voltage source 92. When the transistor 140 is rendered nonconductive, the time interval is increased because the slider 142 of the potentiometer 70 is no longer effectively connected to the high voltage end of the potentiometer 70.

This timing change is preferably made when the matrix switches corresponding to certain critical functions are operated. Such functions may include the ON/OFF function and the CLEAR function. The longer timing interval makes it less likely that these functions will be carried out accidentally, which could have the result of accidentally wiping out a partially completed message which the handicapped person may have laboriously produced on the video display 26.

To produce this timing change, lines 146 and 148 may be connected to the matrix switch 80 which controls the CLEAR function. Lines 150 and 152 may be connected to the matrix switch for the ON/OFF function. The lines 146 and 148 extend to a NOR gate 154, while the lines 150 and 152 extend to a NOR gate 156. The outputs of the NOR gates 154 and 156 are connected to another NOR gate 158 having its output connected to the base of the transistor 140 by a line 160 which is also a CLEAR line.

A buzzer circuit is provided and is arranged to be connected to any particular matrix switch 80 to provide a warning buzzer if such switch is operated. Such buzzer circuit may comprise a NOR gate 162 having input lines 164 and 166 adapted to be connected to any particular matrix switch 80. The output of the NOR gate is connected through a resistor 168 and a transistor 170 to a BUZZER output line 172.

The print command signal is employed to restart the clock 108. For this purpose, the PRINT output line 130 is connected to one input of a flip-flop 174 comprising two NAND gates 176 and 178 connected in a ring. The output of the flip-flop 174 is connected to the gate 124. The other input of the flip-flop 174 is connected to the output line 122 from the multiplexer 88.

Figure 7:
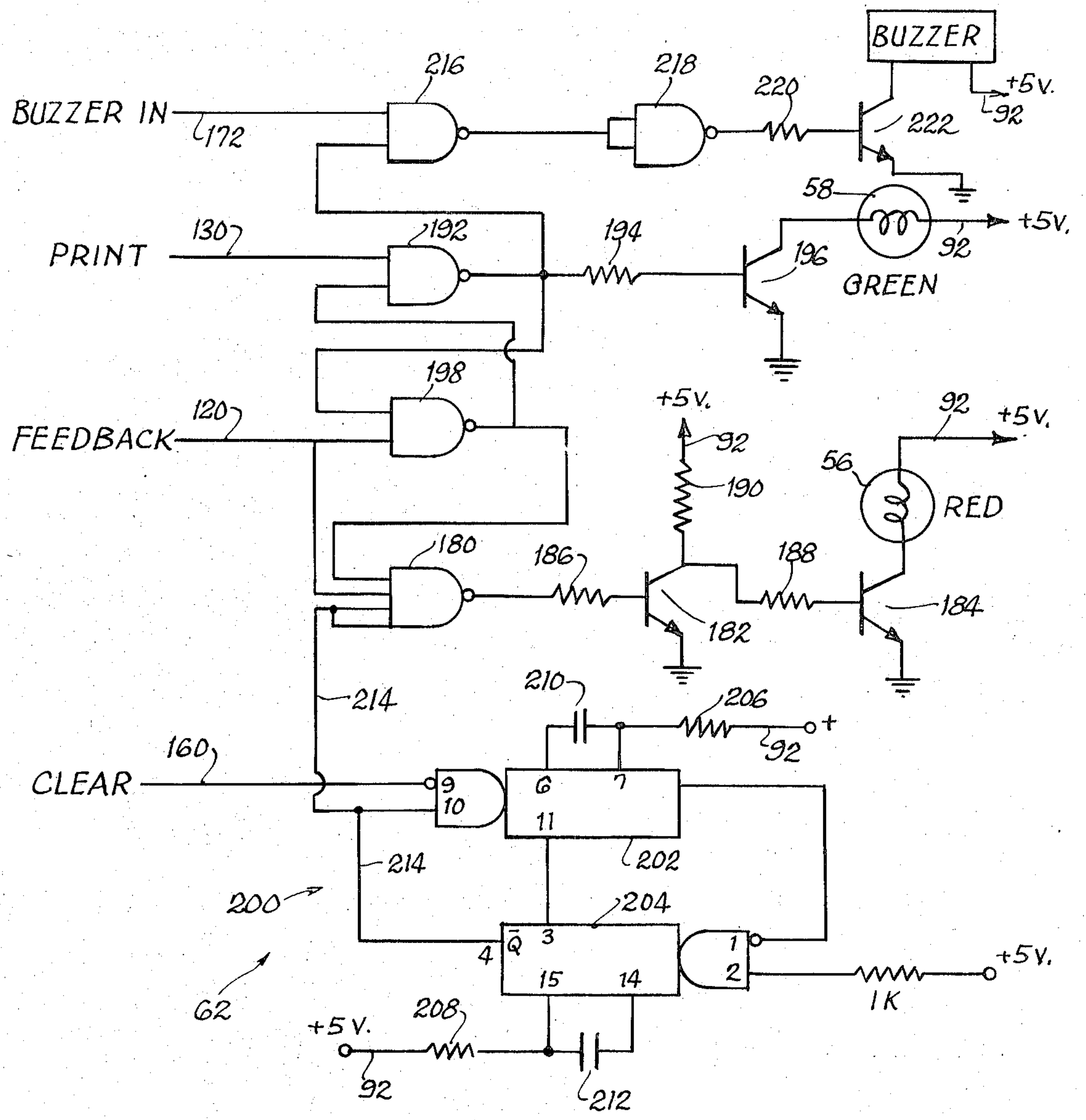
FIG. 7 is a schematic circuit diagram showing additional electronic circuits for producing the feedback signals.

FIG. 7 illustrates details of the feedback circuits 62. It will be seen that the FEEDBACK line 120, the PRINT line 130, the CLEAR line 160 and the BUZZER line 172 extend to the feedback circuit 62 of FIG. 7. The first signal or red light 56 is operated when the signal appears on the FEEDBACK line 120. For this purpose, the FEEDBACK line 120 is connected to one input of a 4-input NAND gate 180. The output of the gate 180 causes operation of the light 56 by means of cascaded transistors 182 and 184 connected in a circuit which includes resistors 186, 188 and 190.

When a signal appears on the PRINT line 130, the green light 58 is operated. For this purpose, the line 130 is connected to one input of a NAND gate 192 having its output connected through a resistor 194 and a transistor 196 to the green light 58. Another NAND gate 198 is connected in a ring with the gate 192 to act as a latch. One input of the gate 198 is connected to the FEEDBACK line 120. The output of the gate 198 is also connected to one of the inputs of the 4-input gate 180. This has the effect of extinguishing the red light 56 when the green light 58 comes on.

The CLEAR line 160 is preferably connected to a flashing circuit 200 which causes flashing of the red light 56. Such flashing circuit 200 may utilize two retriggering monostables 202 and 204 connected in a ring. The monostables 202 and 204 have timing circuits comprising resistors 206 and 208 and capacitors 210 and 212. An output line 214 carries the flashing signal from the monostable 204 to two of the inputs of the gate 180. Thus, the flashing signal opens and closes the gate 180 so as to produce flashing of the red light 56. This flashing is a signal to the handicapped person that he has moved the cursor magnet 30 into the communication squares or elements 14 for the CLEAR function or the ON/OFF function. If the handicapped person does not want to carry out these functions, the flashing red light serves as a warning to move the cursor to a different area.

The BUZZER line 172 is connected to one input of a NAND gate 126 having its output connected to both inputs of another NAND gate 218. A resistor 220 and a transistor 222 are connected between the output of the gate 218 and a buzzer 224. The other input of the gate 216 is connected to the output of the gate 192 in the print circuit.

Figure 8:
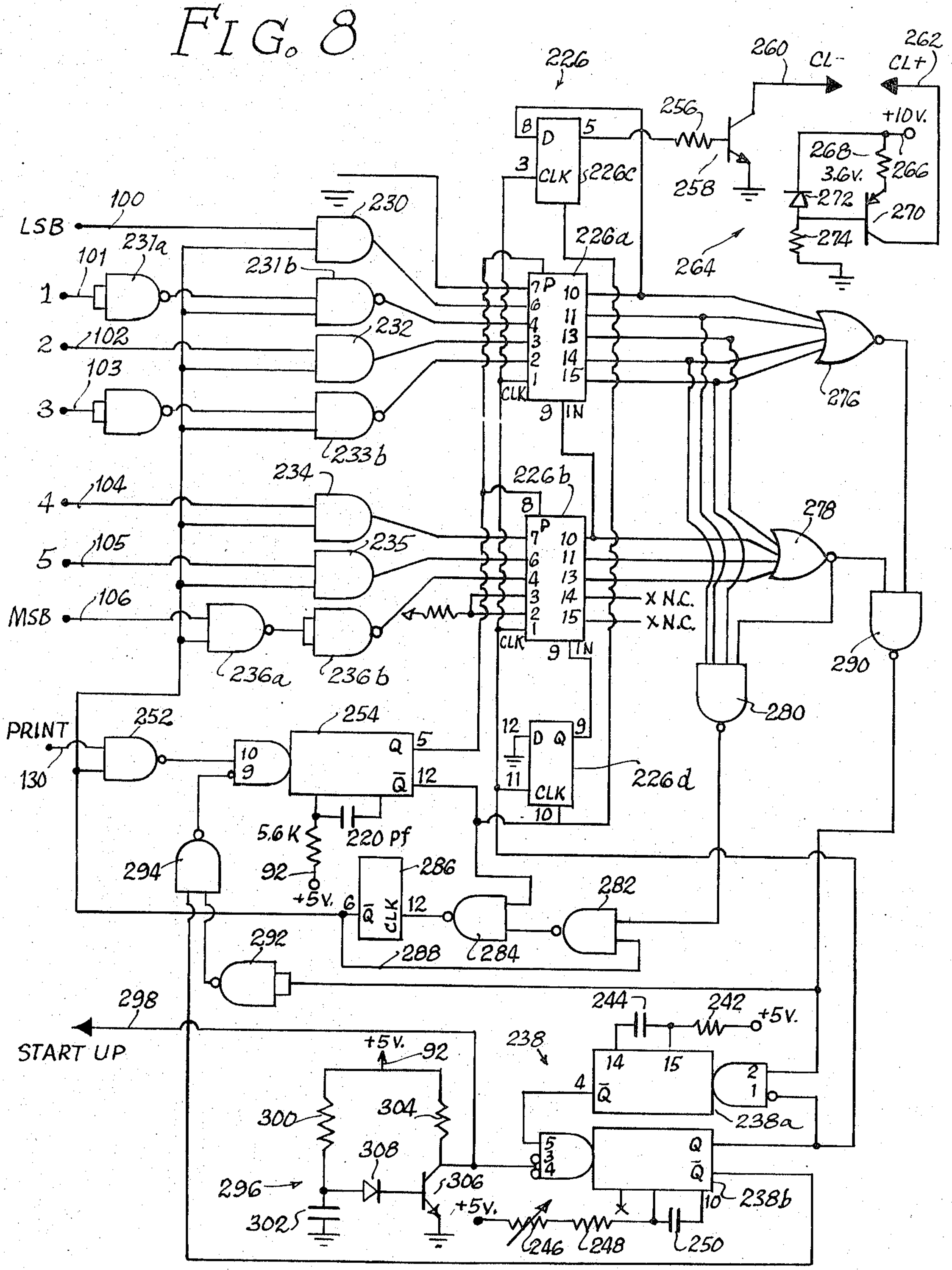
FIG. 8 is a schematic circuit diagram showing additional electronic circuits for converting the parallel output of the encoder to a serial form.

FIG. 8 illustrates details of the parallel-to-serial converter 72 together with the associated circuits. Much of the complexity of FIG. 8 results from circuits which automatically insert a line feed signal whenever a carriage return signal is transmitted to the output. It will be understood that the carriage return signal causes the printer 22 to start a new line, while the line feed signal causes the printer to feed the paper to a new position so that the new line will be printed below the previous line. This automatic feature makes it unnecessary for the handicapped person to insert a line feed signal after each carriage return signal.

It will be seen that the parallel output lines 100, 101, 102, 103, 104, 105 and 106 extend to FIG. 8 from FIG. 6. These lines are also designated LSB, 1, 2, 3, 4, 5 and MSB.

A system of gates is inserted between the lines 100-106 and a shift register system 226. In general, the input signals to the shift register system 226 are loaded in parallel into the system, while the output signals are unloaded serially to produce a serial output. Any suitable serial output code may be employed. In this case, the output code is in the well known 11-bit teletype format.

The illustrated shift register system 226 comprises two 5-bit shift registers 226*a* and 226*b* and two D-type flip-flops 226*c* and 226*d*, all of which are employed to achieve the desired capacity. The shift registers 226*a* and 226*b* and the flip-flops 226*c* and 226*d* may comprise commercially available integrated circuits.

In the illustrated arrangement, the input lines 100–103 are connected to corresponding inputs of the shift register 226*a*. It will be seen that an AND gate 230 is connected between the input line 100 and the corresponding input of the shift register 226*a*. NAND gates 231*a* and 231*b* are connected between the input line 101 and the corresponding input of the shift register 226*a*. An AND gate 232 is connected between the input line 102 and the shift register 226*a*. NAND gates 233*a* and 233*b* are connected between the input line 103 and the shift register 226*a*.

The input lines 104, 105 and 106 are connected to corresponding inputs of the shift register 226*b* through AND gates 234 and 235 and NAND gates 236*a* and 236*b*.

The shift registers 226*a* and 226*b* and the flip-flops 226*c* and 226*d* are triggered by clock pulses supplied by a clock 238, which may comprise a retriggering monostable 238*a* and a monostable one-shot 238*b* connected in a ring. A clock output line 240 is connected between the clock 238 and the shift register elements 226*a*, 226*b*, 226*c* and 226*d*. It will be seen that the monostable 238*a* includes a timing circuit comprising a resistor 242 and a capacitor 244. Similarly, the monostable 238*b* comprises a timing circuit including a variable resistor 246, a fixed resistor 248 and a capacitor 250.

The PRINT line 130, which delivers the print command signal, is connected the shift register system 226 by a circuit comprising a NAND gate 252 and a retriggering monostable 254. The line 130 is connected to one input of the gate 252, while the output of the gate 252 is connected to one input of the monostable 254. As shown, the Q output of the monostable 254 is connected to the shift registers 226*a* and 226*b*, while the Q output is connected to the flip-flops 226*c* and 226*d*. With this arrangement, the print command signal causes the shift register system 226 to be unloaded serially.

The serial output from the shift register system 226 is taken from the Q output of the flip-flop 226*c* through a resistor 256 and a transistor 258 to an output line 260 which is also designated CL−. The negative output line 260 is utilized in conjunction with a positive output line 262, also designated CL+. A conventional 20 milliampere teletype printing loop may be connected between the lines 260 and 262. Such loop may include the printer 22.

Current in the loop may be supplied by a current regulating circuit 264, connected between a positive voltage source 266 and the line 262. The circuit 264 comprises a resistor 268 and a transistor 270 connected in series between the voltage source 266 and the line 262. As shown, a zener diode 272 and a resistor 274 are connected between the voltage source 266 and ground, which represents the negative terminal of the voltage supply. The base of the transistor 270 is connected to the junction between the diode 272 and the resistor 274.

In connection with the automatic line feed circuit, a system of gates is employed to detect the transmission of a carriage return signal. Such gates include a NOR gate 276 having four inputs connected to corresponding outputs of the shift register 226*a*, another NOR gate 278 having one input connected to one output of the shift register 226a and three inputs connected to three outputs of the shift register 226*b*, and a NAND gate 280 having three inputs connected to three outputs of the shift register 226*a* and another input connected to the output of the gate 278.

The output of the gate 280 is connected to one input of a NAND gate 282 having its output connected to one input of another NAND gate 284. The output of the gate 284 is connected to the clock input of a J–K master-slave flip-flop 286, which may comprise a commercially available integrated circuit. The $\overline{Q}$ output of the flip-flop 286 is connected to a line 288 which extends to the gates 230, 231*b*, 232, 233*b*, 234, 235, 236*a* and 252. The line 288 also extends to the second input of the gate 282. The second input of the gate 284 is connected to the $\overline{Q}$ output of the monostable 254.

Still another NAND gate 290 has its inputs connected to the outputs of the gates 276 and 278. The output of the gate 290 is connected to the inputs of a NAND gate 292 having its output connected to one input of a NAND gate 294. The output of the gate 294 is connected to the second input of the monostable 254.

The output of the gate 290 is also connected to one input of the monostable 238a, while the $\overline{Q}$ output of the monostable 238*b* is connected to the second input of the gate 294.

This elaborate system of gates detects the transmission of a carriage return signal and automatically inserts a line feed signal following the carriage return signal. This is done by causing the carriage return signal to be transmitted a second time while modifying it so that it constitutes a line feed signal.

A time delay circuit 296 may be provided to produce a start up signal on a start up line 298, connected to the clock monostable 238*b* of FIG. 8, and also to the clock monostable 112 of FIG. 6. As shown, the timing circuit comprises a resistor 300 and a capacitor 302 connected between the voltage source 92 and ground. A resistor 304 and a transistor 306 are connected in another series circuit between the voltage source 92 and ground. A diode 308 is connected between the junction of the resistor 300 and the capacitor 302 and the base of the transistor 306. The start up line 298 is connected to the collector of the transistor 306. The provision of this circuit insures that the various timing circuits will start up properly when power is first applied to the electronic system.

A modified monitoring system may be provided that is not as simple as the system described above, but is much more tolerant of gross sporadic motions. The modified system is thus especially valuable for children with very severe muscular involvement. It allows very gross motor movements while still keeping the area between letters small. This in turn makes it possible to put all of the alphabet in a small area one that is easily within the range of motion of these handicapped children.

The system works by monitoring the accumulated time spent in each of the last N squares. The number of squares "N" can be varied to account for degrees of control. By watching the accumulated time spent in each of the squares near his indicator, the device can tell which letter the handicapped person is centering his movements over, even if he is entering and leaving many squares in the area.

In the operation of the modified system, the monitoring device watches the indicator as it moves into each square. If the indicator has been in that square recently (if it is one of the last N squares the indicator has been in), the device adds the time now spent in the square to the time previously accumulated in that square. When the total accumulated time reaches a limit, the monitoring device sends the code for the letter out to be printed. When the letter is printed, all of the accumulated time registers are cleared. Only the last "N" squares to be occupied are kept track of. Any previous squares are forgotten by the monitoring device, and if they come up again, their accumulated time will start over at zero.

For example, if a particular square is entered and left, and the indicator is then moved into N other squares, the time accumulated for such particular square is dropped or forgotten by the monitoring device.

If a given square is re-entered after no more than (N−1) other squares have been entered, the accumulated time for the given square will still be in its register and can be increased.

In this manner, random motions around the board will not build up to a print command, but concentrated movements around a letter will. This method, therefore, allows one to effectively increase the "area" of sensitivity of a letter without having to make the letters physically larger and farther apart. Such spreading of the letters is undesirable because it results in a very large field of letters, often much larger than the child's range of motion.

Those skilled in the art will understand that many modifications may be made in the sensing matrix. The sensing can be accomplished in many ways. The best methods do not require any direct tie to the cursor. This means no strings or wires to impede the user's movement, to become tangled and break. Most systems do require the user to maneuver some detectable object about the surface of the board.

In this category are the magnetic, sonic, ultrasonic, radio frequency and optical systems. The magnetic methods use sensitive reed or Hall-effect switches just beneath the board that are actuated by a magnet manipulated by the user. The other types require a transmitter, moved around by the user, and receivers to decode the positions by field strength, direction or propagation delay. These last types are not so desirable, since they require active user-held pointers or indicators rather than a passive magnet. Other schemes could transmit from the control unit to the user's cursor using sonics, RF, or optics, but these still require active circuits in the cursor.

The methods for encoding are also numerous. Every form of logic from discrete to single integrated chip MOS devices can be used. It is desirable that the elements of the sensor matrix may perform a great deal of the encoding process. Also the first stages of the encoder need not encode directly to ASCII, but the encoding should be completed in the output stages. Other codes may be used (EBCDIC, SELECTRIC), but ASCII is the most widely used. The one thing that all these schemes need is an output that signals that the user has positioned his pointer in an area and the electronics recognizes its presence.

It is this signal that the timing circuit uses to initiate the delay before printing. A counter or monostable that is instantly resetable can be used here. This signal is also used in the feedback circuit. The lights used in the present system are coded red and green, but any two colors can be used. One lamp can be sufficient, although two spacially separated lamps provide the best feedback. Audio feedback can be used for the indication of being in an area, but this is found to be generally annoying. A click or similar sound associated with the print signal is, however, very useful.

The transmitter form depends mainly on the receiver, output device, and present (or absence) of connections to the communication board. When the board is wire connected, several options are available. The information may be sent in straight TTL logic levels, via a 20 millampere current loop, differential line drivers, or by frequency or amplitude modulation. The board may be completely detached from other equipment and run on batteries, in which case a radio frequency telemetry system using AM or FM signals is necessary. A receiver is provided to detect the information and relay it to the output device.

Options for output devices are also numerous. They fall into two main categories: hard copy printers and video and non-permanent displays. Hard copy printers can be subdivided into strip printers and page printers. Page printers may be further divided into those which print one letter at a time and immediately reveal that letter, those which must print an entire line, or even an entire page at a time. Those that print more than one letter at a time are of limited use when immediate feedback is needed.

In the non-permanent class of displays are the CRT (cathode ray tube) terminals, video terminal controllers and gas-discharge or LED (light emitting diode) alphanumeric array displays. Complete CRT terminals are excellent output devices for cost and portability. Video terminal controls without built-in CRT's, especially those that will work with a standard television receiver, tend to be best in cost, size and adaptability.

There are also options associated with the hardware. The board itself may be arranged to attach to the user's wheelchair or it may be made to sit on a table, bed or any other surface. The pattern on the board may be shifted to one side to accommodate either left or right-handed users. Or the board can be made longer with spaces on both sides when more than one person is to use it. The arrangement and size of the patterns of characters can be changed to suit most applications or a limitations of the user. All delays and time intervals are adjustable over a wide range of user capabilities. When the automatic communication system is used with the video controller, the controller, any necessary cords, handpieces, or other manipulatable devices can be stored and carried in a single attache-size case for portability.

Those skilled in the art will be able to assign values and type numbers to the various components, which may vary widely in this regard. However, it may be helpful to supply the following table of representative values and type numbers:

| COMPONENT | VALUE OR TYPE NO. |
|---|---|
| 86 | IC No. 74151 |
| 88 | IC No. 74154 |
| 90 | 470 ohms |
| 94,96 | IC No. 74161 or 74163 |
| 110,112 | IC No. 74123 |
| 118 and all other 2-input NAND gates | IC No. 7400 |
| 126,128 | IC No. 74123 |
| 132 and all other general purpose diodes | NO. 1N914 |
| 134 | 5.6K |
| 138 | 200 mf. |

-Continued

| COMPONENT | VALUE OR TYPE NO. |
|---|---|
| 140 and all other general purpose transistors | MPS5172 |
| 142 | 1k. |
| 154,156,158,162 and all other 2-input NOR gates | IC No. 7402 |
| 168 | 1K. |
| 180 | IC. No. 7420 |
| 184 | MPS 6561. |
| 186 | 1k. |
| 188,190 | 470 |
| 194 | 470 |
| 196 | MPS 6561 |
| 202,204 | IC No. 74123 |
| 206,208 | 47k. |
| 210,212 | 15 mf. |
| 220 | 470 |
| 222 | MPS 6561 |
| 226*a*,226*b* | IC No. 7493 |
| 226*c*,226*d* | IC No. 7474 |
| 230,232,233*b*,234,235 | IC No. 7408 |
| 238*a* | 74123 |
| 238*b* | 74121 |
| 242 | 30k |
| 244 | .1 mf |
| 246 | 10k |
| 248 | 30k |
| 250 | .39 mf |
| 254 | 74123 |
| 256 | 2.2k |
| 268 | 130 |
| 270 | MPS 6522 |
| 272 | 3.6 volt zener |
| 274 | 1K |
| 276,278 | IC No. 7425 |
| 280 | IC No. 7420 |
| 286 | IC No. 7472 |
| 300 | 47k |
| 302 | 10 mf |
| 304 | 1k |
| 306 | MPS 5172 |

We claim:

1. A communication device for handicapped persons, comprising a panel having a matrix of communication elements disposed thereon, a matrix of sensors disposed adjacent said panel and corresponding with the matrix of communication elements, a cursor movable along said panel in a sliding fashion into alignment with each of said communication elements to select such element, said cursor including means for operating the sensor corresponding to the selected communication element, output means for producing a particular communications output in response to the operation of each of said sensors, and delay means responsive to the operation of said sensor for delaying the production of such output following the operation of each of said sensors, said delay means being effective to prevent the production of an output until said cursor remains in an operative relationship to any particular sensor for a predetermined amount of time.

2. A communication device for handicapped persons according to claim 1, in which each of said sensors includes means sensitive to the proximity of said cursor and operable by said cursor when in proximity thereto, the effective area of each sensor thereby being increased.

3. A device according to claim 1, in which said delay means includes adjusting means for adjusting said amount of time.

4. A device according to claim 1, in which said delay means includes timing means for causing the production of an output after one of said sensors has been operated for a predetermined continuous time interval.

5. A device according to claim 1, in which said delay means includes timing means for causing the production of an output after one of said sensors has been operated for a predetermined non-continuous accumulated time interval.

6. A communication device for handicapped persons, comprising a panel having a matrix of communication elements disposed thereon, a matrix of sensors disposed adjacent said panel and corresponding with the matrix of communication elements, a cursor movable opposite each of said communication elements and the corresponding sensor to operate such sensor, each of said sensors including means sensitive to the proximity of said cursor and operable by said cursor when in proximity thereto, output means for producing a particular communications output in response to the operation of each of said sensors, and delay means responsive to said sensor for delaying the production of such output following the operation of each of said sensors, said delay means being effective to prevent the production of an output until said cursor remains in operating proximity to any particular sensor for a predetermined amount of time.

7. A device according to claim 6, in which said delay means includes a timer having control means for adjusting said amount of time.

8. A device according to claim 6, in which said delay means includes timing means for causing the production of an output after one of said sensors has been operated for a predetermined continuous time interval.

9. A device according to claim 6, in which said delay means includes timing means for causing the production of an output after one of said sensors has been operated for a predetermined accumulated time interval which may be either continuous or non-continuous.

10. A device according to claim 6, in which said cursor includes a magnet for operating said sensors.

11. A device according to claim 10, in which each of said sensors includes means operable by the proximity of said magnet.

* * * * *